(12) United States Patent
Sievers-Paulsen et al.

(10) Patent No.: US 10,703,428 B2
(45) Date of Patent: Jul. 7, 2020

(54) TOP CASE ARRANGEMENT

(71) Applicant: Bayerische Motoren Werke Aktiengesellschaft, Munich (DE)

(72) Inventors: Johann Sievers-Paulsen, Freising (DE); Peter Reinhart, Peissenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/143,727

(22) Filed: Sep. 27, 2018

(65) Prior Publication Data
US 2019/0031265 A1 Jan. 31, 2019

Related U.S. Application Data

(63) Continuation of application No. PCT/EP2017/054695, filed on Mar. 1, 2017.

(30) Foreign Application Priority Data

Apr. 21, 2016 (DE) .................. 10 2016 206 776

(51) Int. Cl.
*B62J 1/28* (2006.01)
*B62J 7/04* (2006.01)
*B62J 9/20* (2020.01)

(52) U.S. Cl.
CPC . *B62J 1/28* (2013.01); *B62J 7/04* (2013.01); *B62J 9/20* (2020.02)

(58) Field of Classification Search
CPC ... B62J 1/28; B62J 9/001; B62J 99/00; B60N 2/753; B60N 2/773
See application file for complete search history.

(56) References Cited

U.S. PATENT DOCUMENTS

| 4,549,629 A * | 10/1985 | Komuro ................. B60N 2/753 180/219 |
| 4,600,208 A | 7/1986 | Morishima |
| 4,690,237 A | 9/1987 | Funabashi et al. |

(Continued)

FOREIGN PATENT DOCUMENTS

| CN | 2756536 Y | 2/2006 |
| CN | 2841477 Y | 11/2006 |

(Continued)

OTHER PUBLICATIONS

Chinese-language Office Action issued in counterpart Chinese Application No. 201780008304.4 dated Jul. 3, 2019 with English translation (11 pages).

(Continued)

Primary Examiner — Corey N Skurdal
(74) Attorney, Agent, or Firm — Crowell & Moring LLP

(57) ABSTRACT

A top case arrangement for a vehicle, in particular a motor-cycle or a motor-cycle like vehicle, and a vehicle having such a top case, are provided. The top case arrangement includes a top-case, and a base support arranged below the top case. The base support connects to the vehicle structure and includes connecting sections for selectively connecting armrests to the base support. The top case includes in the region of the lower side, at least one cavity in which both connecting sections are arranged when the top case is in an installed position on the vehicle.

9 Claims, 4 Drawing Sheets

(56) References Cited

U.S. PATENT DOCUMENTS

| | | | |
|---|---|---|---|
| 4,915,187 A | 4/1990 | Nakashima et al. | |
| 7,114,774 B2* | 10/2006 | Stahel | A47C 7/68 |
| | | | 297/188.15 |
| 2012/0205957 A1* | 8/2012 | Lindloff | B62J 1/28 |
| | | | 297/411.2 |
| 2015/0217663 A1* | 8/2015 | Parvey | B62J 1/28 |
| | | | 297/411.3 |
| 2018/0057109 A1* | 3/2018 | Kamiyama | B62J 1/02 |

FOREIGN PATENT DOCUMENTS

| | | |
|---|---|---|
| CN | 102530140 A | 7/2012 |
| DE | 19 11 402 U | 3/1965 |
| DE | 10 2012 202 274 B3 | 2/2013 |
| DE | 10 2013 207 190 A1 | 10/2014 |
| JP | 59-104880 U | 7/1984 |
| JP | 59-209978 A | 11/1984 |

OTHER PUBLICATIONS

International Search Report (PCT/ISA/210) issued in PCT Application No. PCT/EP2017/054695 dated Apr. 10, 2017 with English translation (four (4) pages).

German-language Written Opinion (PCT/ISA/237) issued in PCT Application No. PCT/EP2017/054695 dated Apr. 10, 2017 (five (5) pages).

German-language Search Report issued in counterpart German Application No. 102016206776.1 dated Nov. 15, 2016 with partial English translation (14 pages).

Chinese-language Office Action issued in counterpart Chinese Application No. 201780008304.4 dated Jan. 6, 2020 with English translation (13 pages).

\* cited by examiner

TOP CASE ARRANGEMENT

CROSS REFERENCE TO RELATED APPLICATIONS

This application is a continuation of PCT International Application No. PCT/EP2017/054695, filed Mar. 1, 2017, which claims priority under 35 U.S.C. § 119 from German Patent Application No. 10 2016 206 776.1, filed Apr. 21, 2016, the entire disclosures of which are herein expressly incorporated by reference.

BACKGROUND AND SUMMARY OF THE INVENTION

The invention relates to a top case arrangement, in particular to a top case arrangement for a vehicle, in particular a motorcycle or a motorcycle-like vehicle, a vehicle equipped with such a top case arrangement.

Top cases with integrated armrests are known, for example, from US patent specifications U.S. Pat. No. 4,915,187 B and 4,600,208 B. The armrests are installed fixed to the vehicle so that such top case arrangements do not offer the user any possibility of optionally removing the armrests where necessary.

The object of the invention is therefore to provide armrests which can be mounted and dismounted, where necessary, on such a vehicle in a manner which is easy and also for inexperienced users and the vehicle also remains safely usable for the user even in the dismounted state.

There is accordingly provided a top case arrangement for a vehicle, in particular a motorcycle or a motorcycle-like vehicle, with a top case and a base support arranged below the top case, wherein the base support is formed for connection to a vehicle structure and has two linking portions for optional linking of two armrests to the base support. The top case furthermore has in the region of an under side at least one indentation in which both linking portions of the base support are arranged.

This means that the base support comprises at least two linking portions which are arranged in each case for optional linking of one of the two armrests. The top case is configured in such a manner that it has, on its under side, i.e. the outwardly facing surface of a base, at least in the region of this under side, the one or more indentation. An indentation is to be understood, for example, as a recess, an undercut, an offset or a clearance of the base which is provided in the otherwise, for example, case- or chest-shaped contour of the top case and provides a receiving volume for receiving one or both linking portions.

The receiving volume is accordingly a space defined by the indentation, which space is defined on one hand by the wall provided by the indentation and on the other hand is opened with respect to the surroundings. The indentation can be defined, for example, by side walls, which protrude beyond the under side, of the top case. In this case, the side walls protrude, for example, in the downward direction.

The receiving volume defined by the indentation should fundamentally be differentiated from an actual luggage volume of the top case, wherein luggage can be arranged in the luggage volume and is enclosed by the top case.

In each case, at least in the installed or installable state of the top case arrangements, the two linking portions are positioned inside this at least one indentation. The two linking portions can accordingly be arranged in the same indentation or in each case in a separate indentation. The rest of the base support can also be arranged either in one or two indentations, or in an additional indentation of the under side of the base or outside such indentations.

The top case arrangement offers the particular possibility that the linking portions are arranged in the at least one indentation in such a manner that they do not protrude beyond its outer contour at least in a lateral direction of the top case. The linking portions can additionally also be arranged entirely in the at least one indentation so that they, also on the under side of the top case, do not protrude out of the associated indentation and thus beyond the contour of the top case.

In this manner, the possibility of a permanent fastening of the base support to the vehicle is created irrespective of whether the armrests are mounted or not. In the event that no armrests are connected to the linking portions, rather only the base support is provided on the vehicle, a projection of the linking portions beyond the top case is avoided and thus hindrance to the user or a risk of injury by otherwise projecting linking portions is effectively eliminated.

Where necessary, the armrests can be fastened to the top case arrangement without further complex measures. Dismounting or mounting of the armrests can thus be carried out without simultaneous dismounting or mounting of the base support and is thus possible even for inexperienced users without greater outlay. Instead, the base support can be part of the top case arrangement and thus remains mounted on the vehicle at all times during user operation.

According to one embodiment, the top case forms, in a non-mounted state of the armrests, a covering at least of the two linking portions of the base support by means of the at least one indentation.

For example, the top case can, for this purpose, have the two described side walls which, for the formation of the indentation, project beyond the under side of the top case and additionally comprise in each case a removable wall portion which forms at least one lateral covering of one of the two linking portions. This means that the side walls of the top case, as a result of their projection beyond the under side, laterally delimit the indentation and thus define the receiving volume. The wall portions are to be understood as removable sub-portions of the side walls. For the receiving portions arranged (at least partially) in the indentation, this means that these are covered and protected at least by the downwardly protruding side walls in the lateral direction.

All spatial indications, in particular "top", "front", "rear", "below" and "lateral", are to be understood in terms of an orientation of the top case arrangement in an installed state on the vehicle and in accordance with its orientation. For example, the side walls of the top case are accordingly oriented according to the corresponding vehicle sides.

These removable wall portions can furthermore be connected in each case by means of a positive-locking and/or non-positive connection detachably to the respectively assigned side wall (i.e. to be more precise: of the remainder of the side wall) of the top case. This offers the possibility of removing the lateral covering of the linking portions where necessary and making these accessible, in particular for connection to in each case one armrest. In this case, only the respective detachable wall portion must be removed. The wall portion is correspondingly formed as a removable panel.

It is furthermore possible that the under side of the top case comprises one or more further recesses for at least partial reception of the base support. This means that the base support on the under side of the top case can be inserted into the recess(es) fully or only with further portions so that a compact and modular top case arrangement is provided. These recesses can also be embodied as further depressions, indentations or undercuts.

The base support is preferably formed for connection to a vehicle structure embodied as a rear frame. The top case can also be connected to the base support, in particular fastened thereon.

Each of the two linking portions can furthermore be configured for positive-locking and/or non-positive linking in each case of an armrest. The term armrest refers, for example, to armrest stumps which are connected to the base support and are fastened via this to the vehicle structure.

For example, the two linking portions are arranged at opposite ends of the base support. The armrests can correspondingly be attached at both sides of the top case and thus on both sides of the vehicle or at both sides of a vehicle user sitting on the vehicle.

Moreover, there is proposed a vehicle, in particular a motorcycle or a motorcycle-like vehicle, with a top case arrangement, wherein the top case arrangement is formed according to the description. The term motorcycle-like vehicle refers in particular to all single-track vehicles, but also to multi-track vehicles in each case with a corresponding saddle-shaped seat or seat bench for the user, particularly preferably two-wheeled, three-wheeled or four-wheeled motor scooters and scooters, as well as quads or trikes.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
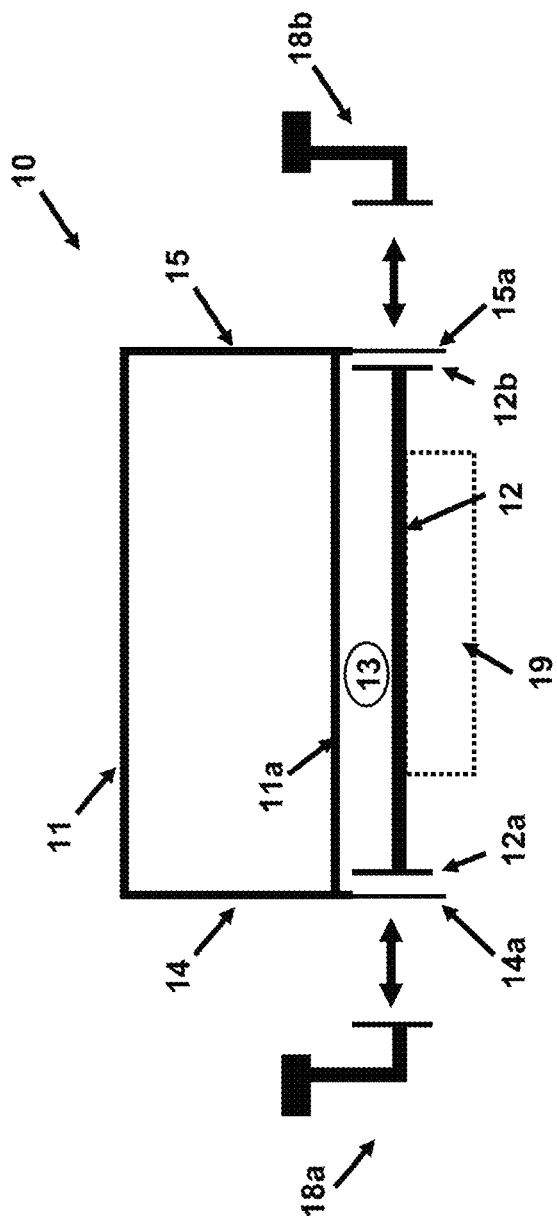
FIG. 1 shows a schematic frontal view of a top case arrangement according to an embodiment of the present invention.

A frontal view of a top case arrangement 10 is illustrated in FIG. 1 in a purely schematic and highly simplified representation. Top case arrangement 10 is provided for a vehicle (not represented), such as, for example, a motorcycle or a motorcycle-like vehicle, and has for this purpose a top case 11 and a base support 12 arranged below top case 11.

Base support 12 is formed for connection to a merely indicated vehicle structure 19 and furthermore has two linking portions 12a, 12b for optional linking of two armrests 18a, 18b to base support 12. Both linking portions 12a, 12b are arranged at opposite ends of base support 12. For the sake of clarity, both armrests 18a, 18b are represented spaced apart from linking portions 12a, 12b, but these are connected in the installed state directly to linking portions 12a, 12b. Each of both linking portions 12a, 12b is correspondingly formed for positive-locking and/or non-positive linking in each case of an armrest 18a, 18b.

Top case 11 furthermore has in the region of an under side 11a an indentation 13 which define a receiving volume in which both linking portions 12a, 12b are arranged. Entire base support 12 is furthermore also arranged in indentation 13 in the represented embodiment.

Indentation 13 is configured such that top case 11, in a non-mounted state of the armrests (as represented), forms by means of indentation 13 a covering of both linking portions 12a, 12b of base support 12. Linking portions 12a, 12b are thus covered and protected at least from above and both sides by a wall of indentation 13. A hindrance or risk of injury to a user by linking portions 12a, 12b is prevented.

To this end, two side walls 14, 15 of top case 11 are provided which project downwards beyond under side 11a of top case 11 for formation of indentation 13 and to this end comprise in each case one wall portion 14a, 15a. Each of wall portions 14a, 15a forms in each case the lateral covering of one of both linking portions 12a, 12b.

Wall portions 14a, 15a can be connected, for example, in each case detachably by means of a non-positive and/or positive-locking connection to respectively assigned side wall 14, 15 of top case 11.

Base support 13 is furthermore formed for connection to a vehicle structure 19 embodied as a rear frame.

For the represented case that no armrests 18a, 18b are connected to the linking portions, rather only base support 12 is provided on the vehicle, a projection of the linking portions in the lateral direction beyond top case 11 is avoided and thus—as described—a hindrance to the user or a risk of injury by otherwise projecting linking portions is effectively eliminated.

Figure 2:
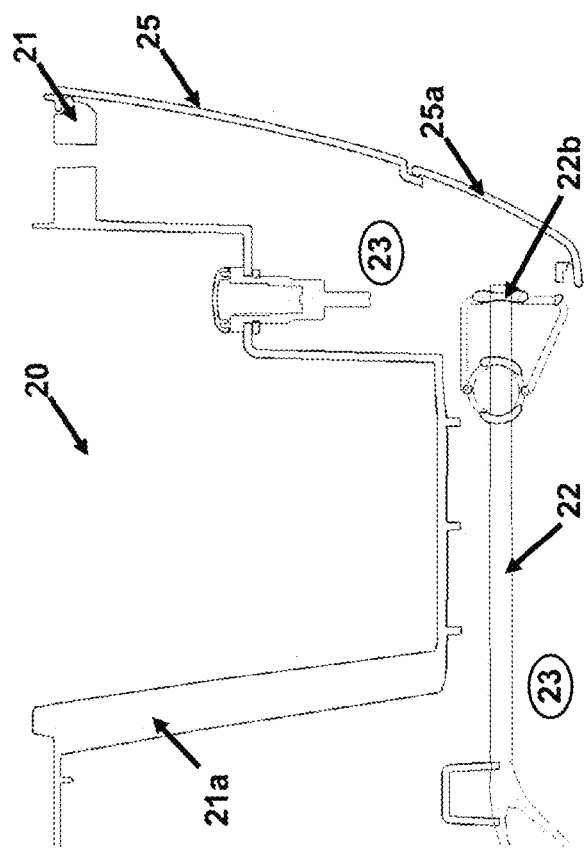
FIG. 2 shows a partial sectional view of a top case arrangement according to an embodiment of the present invention.

FIG. 2 shows a further embodiment, represented in greater detail, of a top case arrangement 20 in a partial sectional view also from a frontal perspective. Top case 21 of top case arrangement 20 has an under side 21a which has an indentation 23 which is pronounced locally to different degrees. A base support 22 is arranged at least partially in said indentation 23, which base support 22 has a receiving portion 22b at its lateral end. Said 22b is covered by under side 21a of top case 21 and by lateral wall portion 25a and is thus arranged within indentation 23. Wall portion 25a represents a sub-portion 25, which projects beyond under side 21a, of a side wall 25 of top case 21 and continues this 25 downwards for generation of a continuous side contour of top case 21.

Figure 3:
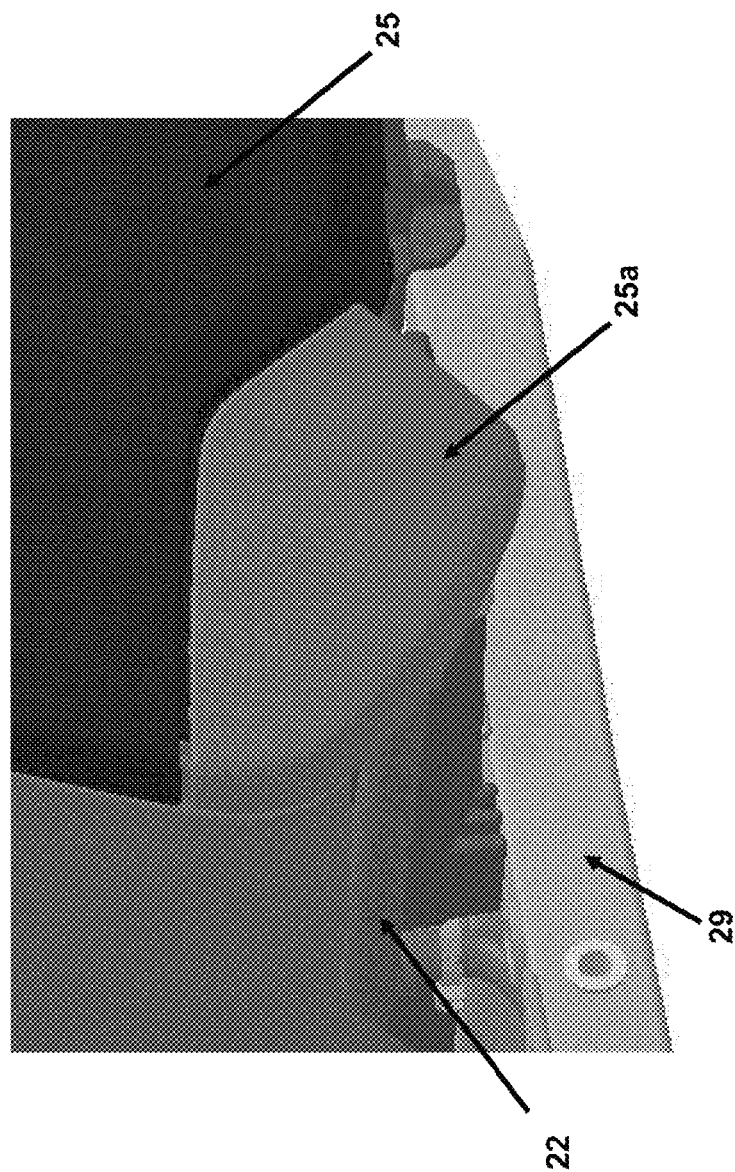
FIG. 3 shows a perspective partial view of the top case arrangement from FIG. 2 with a mounted wall portion.

A perspective partial view of top case arrangement 20 from FIG. 2 with a mounted wall portion 25a is represented in FIG. 3, wherein top case arrangement 20 is connected to a vehicle structure 29 embodied as a rear frame. It is apparent that wall portion 25a forms a sub-portion of side wall 25 and at least laterally covers linking portion 22b lying therebehind (not visible) of base support 22.

Figure 4:
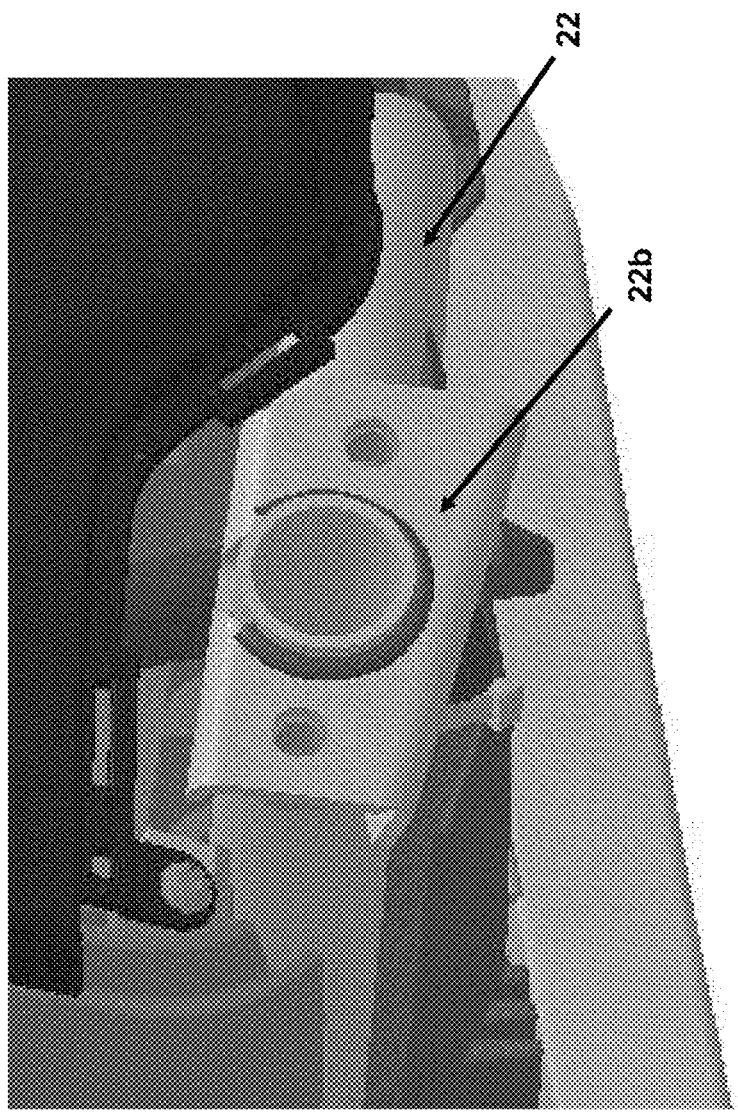
FIG. 4 shows a perspective partial view of the top case arrangement from FIGS. 2 and 3 with a removed wall portion.

FIG. 4 shows a perspective partial view of top case arrangement 20 from FIGS. 2 and 3 with removed wall portion 25a (not represented). Non-covered connecting portion 22b of base support 22 is correspondingly apparent, to which connecting portion 22b an armrest 18b (not represented) can be attached.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A top case arrangement for a vehicle, comprising:
a top case; and
a base support arranged at least partially below a central region of the top case that is between lateral sides of the top case, the base support having linking portions, each linking portion being configured to receive a corresponding armrest,
wherein
the base support is configured to connect the top case to a structure of the vehicle that is at least partially below the top case, and
the top case has at an underside at least one indentation configured to accommodate the base support linking portions when the top case is in an installed position on the vehicle.

2. The top case arrangement as claimed in claim 1, wherein
the vehicle is a motorcycle or a saddle-shaped seat-equipped vehicle.

3. The top case arrangement as claimed in claim 2, wherein
the at least one indentation is configured such that, when the top case is in the installed position and no armrests are present on the base support linking portions, the top case covers at least the linking portions of the base support in the at least one indentation.

4. The top case arrangement as claimed in claim 3, wherein
the top case has two side walls which project beyond the underside of the top case at the indentation, each of the two side walls having a wall portion forming at least one lateral covering of a corresponding one of the linking portions.

5. The top case arrangement as claimed in claim 4, wherein
the wall portions are detachably connected to the respective side wall of the top case by at least one of a non-positive and a positive-locking connection.

6. The top case arrangement as claimed in claim 2, wherein
the vehicle structure is a rear frame.

7. The top case arrangement as claimed in claim 2 wherein
each of the linking portions is configured to receive the corresponding armrest in at least one of a positive-locking and a non-positive manner.

8. The top case arrangement as claimed in claim 2, wherein
the base support has ends opposite one another in a direction transverse to a longitudinal direction of travel of the vehicle, and
the linking portions are arranged the opposite ends of the base support.

9. A vehicle including a top case arrangement, comprising:
a top case; and
a base support arranged at least partially below a central region of the top case that is between lateral sides of the top case, the base support having linking portions, each linking portion being configured to receive a corresponding armrest,
wherein
the base support is configured to connect the top case to a structure of the vehicle that is at least partially below the top case, and
the top case has at an underside at least one indentation configured to accommodate the base support linking portions when the top case is in an installed position on the vehicle.

* * * * *